(12) United States Patent
Sato

(10) Patent No.: US 6,515,771 B1
(45) Date of Patent: Feb. 4, 2003

(54) IMAGE READING APPARATUS HAVING A REFERENCE IMAGE AND MEASUREMENT MEANS FOR MEASURING DISTORTION BASED ON READING THE REFERENCE IMAGE

(75) Inventor: Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/016,423

(22) Filed: Jan. 30, 1998

Related U.S. Application Data

(63) Continuation of application No. 08/358,729, filed on Dec. 19, 1994, now abandoned.

(30) Foreign Application Priority Data

Dec. 22, 1993 (JP) .............................................. 5-324362

(51) Int. Cl.[7] .......................... H04N 1/409; H04N 1/047
(52) U.S. Cl. ...................... 358/3.26; 358/406; 358/474; 358/463; 250/559.39
(58) Field of Search ................................ 358/406, 474, 358/494, 497, 461, 463, 3.26; 250/201.2, 201.8, 559.29, 559.39; 382/255, 274, 275

(56) References Cited

U.S. PATENT DOCUMENTS

| | | | |
|---|---|---|---|
| 4,695,722 A | | 9/1987 | Motooka ..................... 358/494 |
| 4,709,147 A | | 11/1987 | Arai ............................. 358/494 |
| 4,806,780 A | * | 2/1989 | Yamamoto et al. .......... 358/461 |
| 4,864,415 A | | 9/1989 | Beikirch et al. ............. 358/474 |
| 5,231,513 A | * | 7/1993 | Yokobori et al. ............ 358/461 |
| 5,282,060 A | * | 1/1994 | Kizu et al. ................... 358/461 |
| 5,283,698 A | | 2/1994 | Fukuzawa et al. .......... 359/896 |
| 5,315,414 A | * | 5/1994 | Beikirch et al. ............. 358/512 |

FOREIGN PATENT DOCUMENTS

| | | | | |
|---|---|---|---|---|
| EP | 0 261 966 A2 | * | 3/1988 | .......... H04N/1/028 |
| EP | 892 546 A2 | * | 1/1999 | .......... H04N/1/053 |

* cited by examiner

*Primary Examiner*—Scott Rogers
(74) *Attorney, Agent, or Firm*—Fitzpatrick, Cella, Harper & Scinto

(57) ABSTRACT

In an image reading apparatus for reading an original mounted on an original mount by a sensor, such as a CCD (charge-coupled device) or the like, a reference image is provided in a plane substantially the same as an original-mounting surface of the original mount, and the reference image is read by the sensor. Distortion in the main body of the image reading apparatus when installing the apparatus in a "location of use" is thereby measured.

17 Claims, 6 Drawing Sheets

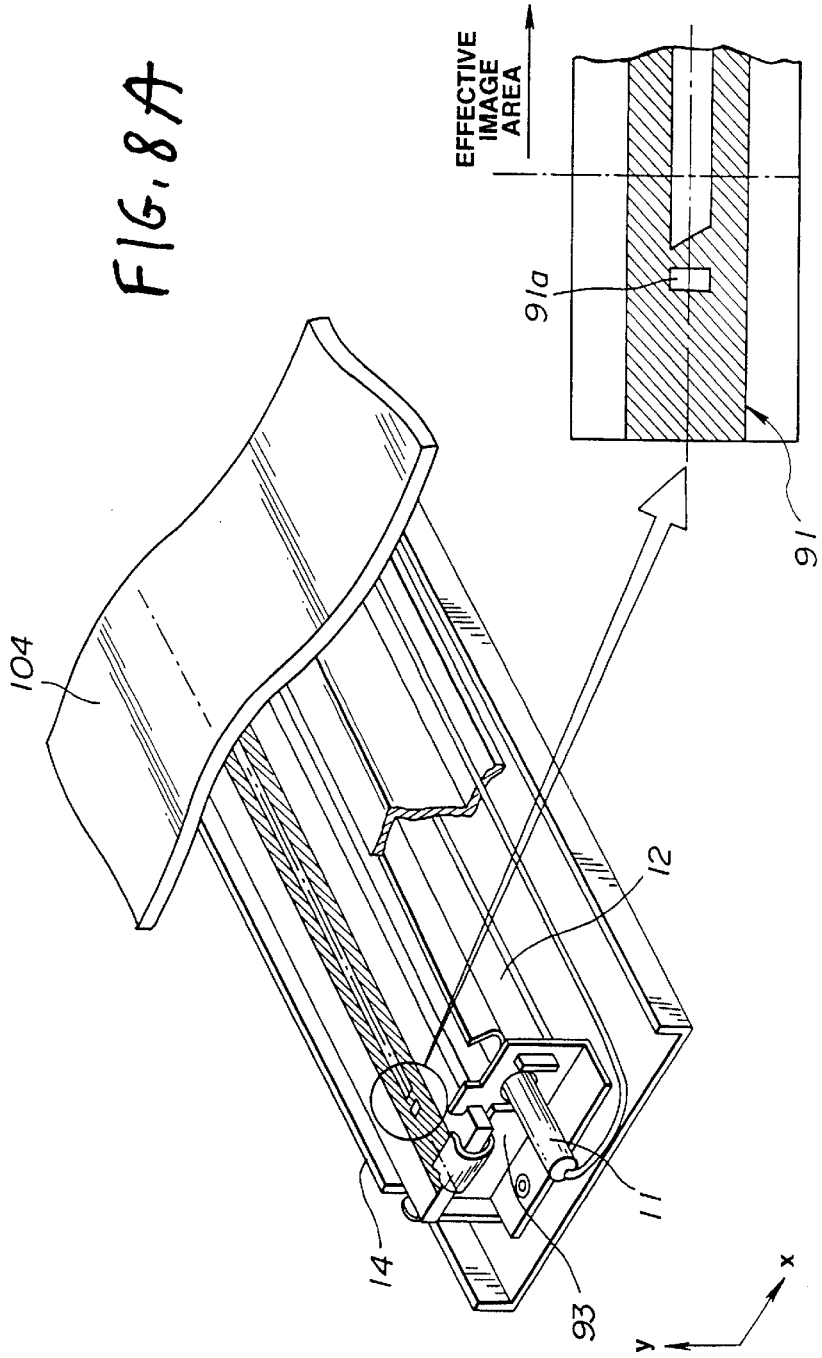

IMAGE READING APPARATUS HAVING A REFERENCE IMAGE AND MEASUREMENT MEANS FOR MEASURING DISTORTION BASED ON READING THE REFERENCE IMAGE

This application is a continuation of application Ser. No. 08/358,729, filed Dec. 19, 1994, now abandoned.

BACKGROUND OF THE INVENTION

1. Field of the Invention

This invention relates to an image reading apparatus which is used in a copier, a facsimile apparatus or the like, and more particularly, to an image reading apparatus for reading an original mounted on an original mount with a sensor.

2. Description of the Related Art

In order to exactly reproduce an image of an original by a copier or the like, it is necessary to precisely read the image of the original. Factors affecting image reading precision include reading resolution, reading magnification, synchronization between the leading edge of the original and the position to start reading the image printed on the original, the degree of inclination between a reference line for mounting the original and a reading line, and the like. These factors must be adjusted.

In an image reading apparatus using a solid-state image sensor, such as a CCD (charge-coupled device) or the like, most of these factors are generally adjusted in a production line when producing the device. A conventional method of such adjustment will be described with reference to FIGS. 6 through 8. In FIG. 6, optical elements for guiding an image of an original to a CCD 98 comprise a full-speed mirror unit 93, including a slit 91, a first mirror 92 and an illuminating device (not shown), a half-speed mirror unit 96, including a second mirror 94 and a third mirror 95, and an imaging unit 100, including an imaging lens 97 for forming the image of the original on the CCD 98 while reducing the image, the CCD 98 and a CCD driver 99. In the adjustment, attention must be paid to basic items necessary for optical elements, such as magnification, resolution and the like, orthogonality between an image reading line 0 and the scanning direction P of the full-speed mirror unit 93, parallelism between the image reading line 0 and the center line Q of the slit 91, coincidence between the center line Q of the slit 91 and the longitudinal axis R of the CCD 98 in the direction of the shorter side of the slit 91 via the respective optical elements (hereinafter termed "synchronous adjustment"), and the like. In the method of adjustment in the production line, a jig chart 101 shown in FIG. 7 is held at the position of original-mount glass 104, and the image of the jig chart 101 is formed on the CCD 98 by projecting light onto the chart 101. Optical distortion is generally adjusted while processing respective output signals from the CCD 98 by a personal computer 102 and monitoring the processed signals on a monitor 103 so that resolution, magnification, synchronism and orthogonality are adjusted using portions A1, the interval between portions B1, tapered charts C1, and portions D1 on the jig chart 101, respectively.

However, even when the above-described factors have been adjusted in the production line, optical distortion from the original mount to the CCD is produced due to vibration produced while the apparatus is conveyed along the production line. Also, when the apparatus is mounted on a plane which is not flat, distortion is produced in the main body of the apparatus, thereby producing optical distortion from the original mount to the CCD.

In order to solve such problems, a method has been proposed in U.S. Pat. No. 5,283,698, issued Feb. 1, 1994, in which distortion in the main body of an apparatus is easily measured after the main body of the apparatus has been installed at a "location of use".

In the '698 patent, there has been proposed, as shown in FIGS. 8a and 8b, to provide apertures 91a for detecting deviation in the relative positional relationship between the slit and the CCD at two end portions of the slit 91 in the longitudinal direction corresponding to portions outside the effective image region of the CCD. It is thereby possible to perform optical adjustment without using a jig chart when installing the main body of the apparatus.

In the invention described in the '698 patent, however, it is necessary to precisely dispose a chart having the slit and the apertures, formed separately from the full-speed mirror unit 93, on the full-speed unit 93, thereby causing an increase in production cost due to adjustment and the like. If the slit is not precisely disposed, there is also the possibility of blocking image light from an original more than necessary. In addition, since portions outside the effective image region of the CCD are used, the CCD must have an additional number of pixels. Furthermore, since it is impossible to dispose the slit on the same surface as the upper surface of the original-mount glass, i.e., the surface of an object to be read, the apertures must be read at a defocused position of the imaging lens, thereby reducing reading accuracy.

SUMMARY OF THE INVENTION

The present invention has been made in consideration of the above-described problems.

It is an object of the present invention to provide an image reading apparatus capable of precisely measuring distortion in the main body of the apparatus.

It is another object of the present invention to provide an image reading apparatus capable of precisely measuring optical distortion from an original mount to an image-light reading sensor.

According to one aspect, the present invention, which achieves these objectives, relates to an image reading apparatus, comprising an original mount, scanning means for scanning an original mounted on the original mount, a sensor for reading an image scanned by the scanning means, and a reference image provided on substantially the same plane as an original-mounting surface of the original mount. The reference image is scanned by the scanning means and is read by the sensor. The apparatus further comprises measuring means for measuring distortion in a main body of the apparatus based on an output from the sensor obtained by reading the reference image.

According to another aspect of the present invention, an image forming apparatus for forming an image on a recording material in accordance with an image signal obtained by reading an original includes an image reading portion and an image recording unit. The image reading portion includes an original mount including an original-mounting surface, a scanner for scanning an original mounted on the original mount, a sensor for reading an image scanned by the scanner and outputting a signal indicative of the image scanned, a reference image provided in a plane substantially the same as the original-mounting surface of the original mount, the reference image being scanned by the scanner and being read by the sensor, and measuring means for measuring distortion in a main body of the image reading portion based on an output from the sensor obtained by reading the reference image. The image recording unit records the image scanned by the scanner on a recording medium using the signal output by the sensor.

According to another aspect of the present invention, a method of measuring distortion in a main body of an image reading apparatus includes the steps of scanning the reference image provided in a plane substantially the same as an original-mounting surface of an original mount in the image reading apparatus, reading the reference image scanned, outputting a signal in accordance with the reference image read, and measuring distortion in the main body of the image reading apparatus based on the signal output.

The foregoing and other objects, advantages and features of the present invention will become more apparent from the following detailed description of the preferred embodiment taken in conjunction with the accompanying drawings.

BRIEF DESCRIPTION OF THE DRAWINGS

FIGS. 8a and 8b are diagrams illustrating a method of adjusting optical elements when installing the main body of a device described in U.S. Pat. No. 5,283,698.

DETAILED DESCRIPTION OF THE PREFERRED EMBODIMENT

A preferred embodiment of the present invention will now be described in detail with reference to the drawings.

Figure 1:
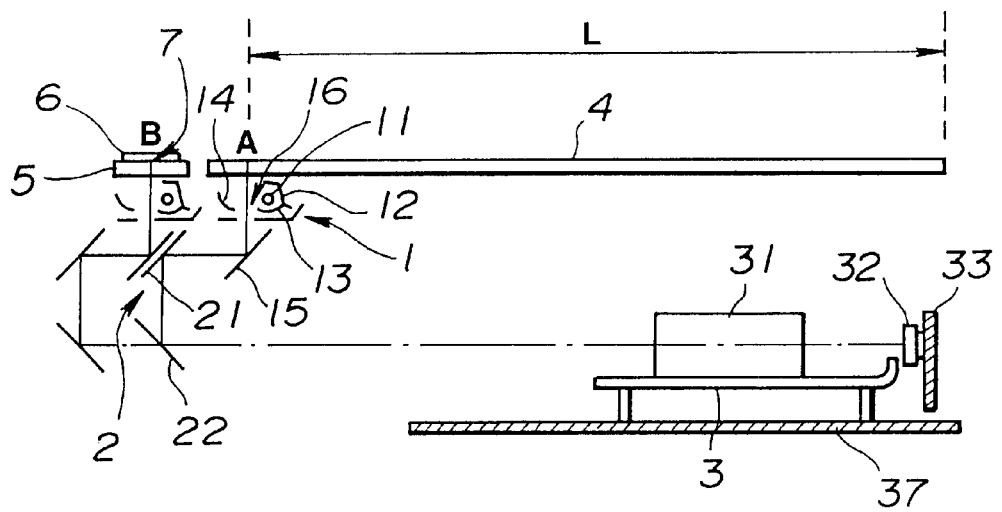
FIG. 1 is a schematic cross-sectional view of an image reading device according to an embodiment of the present invention.
Figure 2:
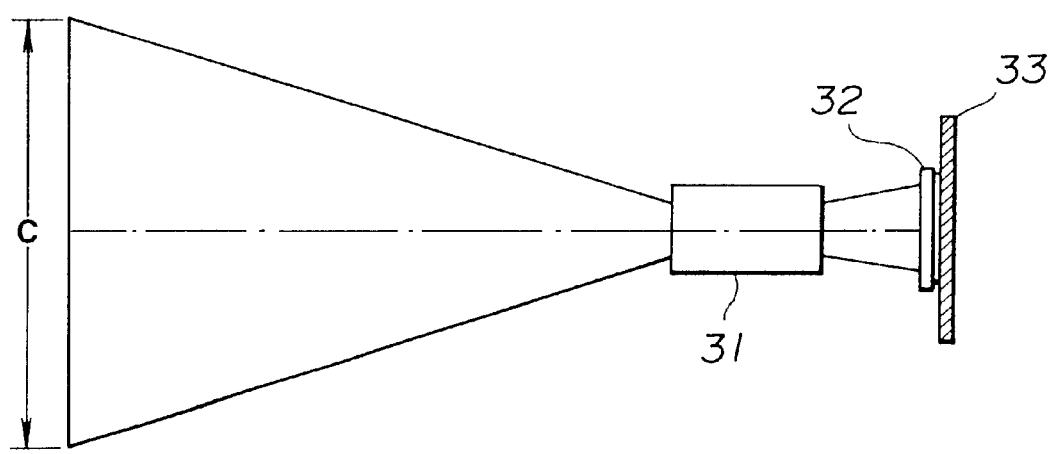
FIG. 2 is a schematic plane view showing the development of an optical path of the image reading device shown in FIG. 1.
Figure 3:
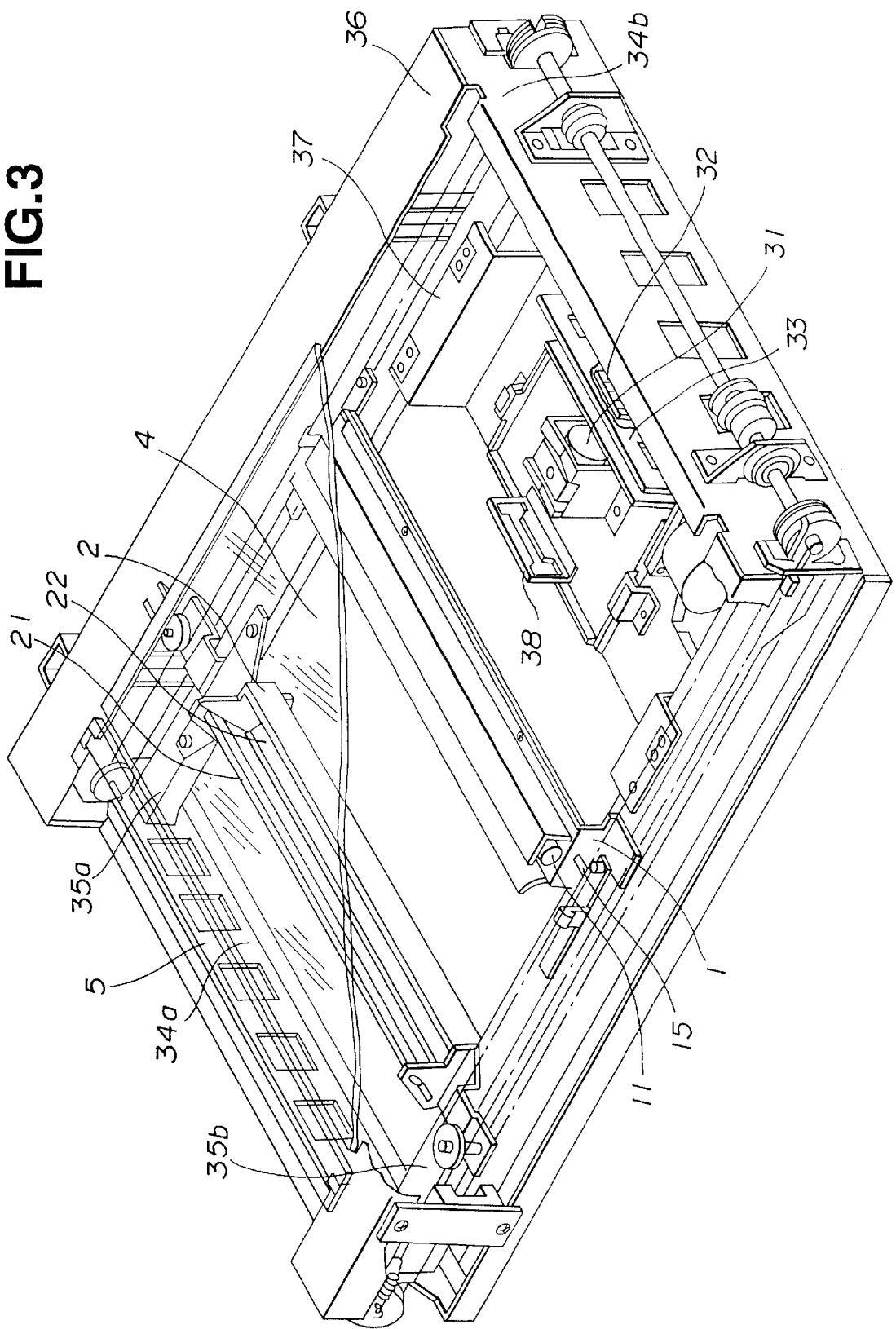
FIG. 3 is a perspective view of the image reading device shown in FIG. 1.

FIG. 1 is a schematic cross-sectional view illustrating the configuration of an image reading apparatus according to the embodiment. FIG. 2 is a schematic plane view in which an optical path of the apparatus shown in FIG. 1 is developed. FIG. 3 is a perspective view of the apparatus shown in FIG. 1.

In FIG. 1, a full-speed mirror unit 1 includes an illuminating lamp 11 for illuminating an original, reflectors 12, 13 and 14, a first mirror 15, and a slit 16 for blocking unnecessary light, as one body. A half-speed mirror unit 2, which moves at a speed half the speed of the full-speed mirror unit 1, includes a second mirror 21 and a third mirror 22 as one body.

The full-speed mirror unit 1 and the half-speed mirror unit 2 constitute scanning means for scanning the original. As shown in FIG. 3, the full-speed mirror unit 1 and the half-speed mirror unit 2 are guided in a direction parallel to an original mount 36 by guide rails 35a and 35b held on side walls 34a and 34b of the main body of the apparatus, respectively.

The original mounted on original-mount glass 4, which is a portion of the original mount 36, is optically scanned by the full-speed mirror unit 1. Reflected light from the original passing through the slit 16 is guided to an imaging unit 3 via the second mirror 21 and the third mirror 22 of the half-speed mirror unit 2, and is imaged onto a CCD 32, serving as a solid-state image pickup device (line sensor). The imaging unit 3, the CCD 32, a CCD driver 33, and a shading correction plate 38 (see FIG. 3) are supported as one body on a unit plate 37. The imaging unit 3, the CCD 32, the CCD driver 33 and the shading correction plate 38 are assembled as one body in a production line, and are mounted on the reading apparatus after performing optical adjustment.

The slit 16 has a long aperture in a direction of arrangement of pixels (photosensors) of the CCD 32. Reference numeral 5 represents dummy glass having charts 7, serving as a reference image used in the present embodiment. The charts 7 are disposed at the same height as the upper surface of the original-mount glass 4 of the original mount 36 at a position different from that of the original-mount glass 4 and having a distance optically equivalent to the distance between the scanning means and the surface of the original. A white plate 6 is disposed so as to cover the dummy glass 5 from above. FIG. 2 is a diagram illustrating the longitudinal direction of the optical path shown in FIG. 1. A width C equals the maximum original reading width (about 300 mm).

A description will now be provided of a method of measuring optical distortion from the original mount 36 to the CCD 32 in the above-described configuration. The charts 7, which are black, shown in FIG. 4 are provided on the upper surface of the dummy glass 5 disposed within the same plane as that of the original-mount glass 4. Each of the charts 7 has the shape of a rectangular equilateral triangle, whose slanting surface has an angle of 45°. The interval between the charts 7 substantially equals the effective image reading width C. When there is no margin in pixels of the CCD, the interval between the charts 7 may be narrower than the effective image reading width C. In FIG. 1, symbol A represents the leading edge of the image of the original mounted on the original-mount glass 4 while being adjusted to a reference position for mounting the original (not shown). The dummy glass 5 and a chart reading position B are disposed outside a reading region L (FIG. 1) when reading the original, in the moving direction of the full-speed mirror unit 1. When measuring distortion, a switch (not shown) for moving the scanning means to the outside of the reading region L is depressed, and the full-speed mirror unit 1 is moved to the chart reading position B.

Figure 4A:
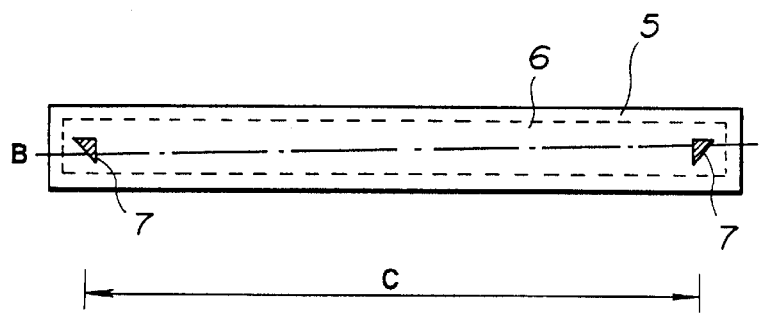
FIGS. 4a and 4b illustrate charts used in the device shown in FIG. 1 and a corresponding output signal from a CCD.
Figure 4B:
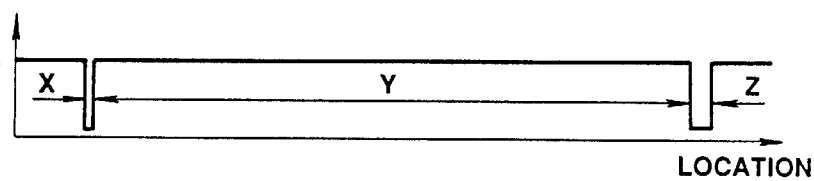

Thereafter, the illuminating lamp 11 is lit to illuminate the position B. Since the white plate 6 is disposed on the upper surface of the dummy glass 5 via the chart 7, an output signal from the CCD for the position B is a signal as shown in FIGS. 4a and 4b. It is possible to detect from this output signal the amount of distortion of the main body of the apparatus, i.e., the amount of optical distortion from the original mount 36 to the CCD 32.

A method of calculating the amount of distortion will now be described.

The numbers of pixels corresponding to portions X, Y and Z shown in FIG. 4 are detected from the CCD output signal. In FIG. 4, symbols X and Z represent the lengths of the charts 7 crossed by the illuminating light, and symbol Y represents the interval between the charts 7. The amount of inclination $\Delta$ of the charts 7 sensed by the CCD 32 is expressed by:

$$\Delta=(X-Y)/(X+Y+Z).$$

If the amount of inclination calculated by an arithmetic unit (not shown) using the above-described expression when adjusting the apparatus in the production line (i.e., the initial state) and stored in storage means (not shown) is represented by $\Delta 1$, and the amount of inclination calculated when installing the apparatus is represented by $\Delta 2$, the amount of variation $\Delta H$ is expressed by:

$$\Delta H = \Delta 2 - \Delta 1.$$

Figure 5A:
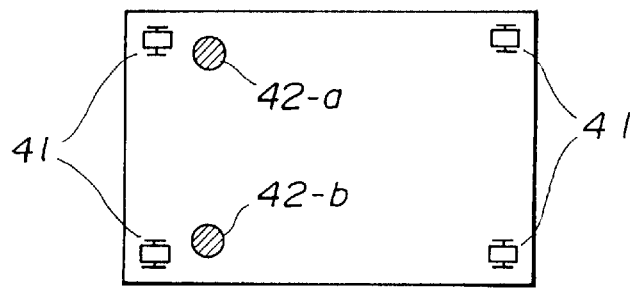
FIG. 5(a) is a bottom view of the main body of an apparatus incorporating the device.
Figure 5B:
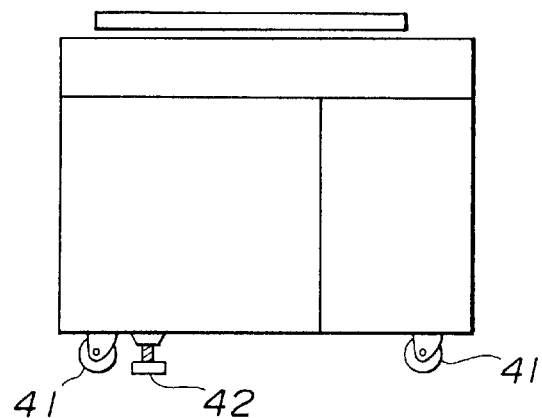
FIG. 5(b) is a front view of the main body of the apparatus shown in FIG. 5(a)
Figure 7:
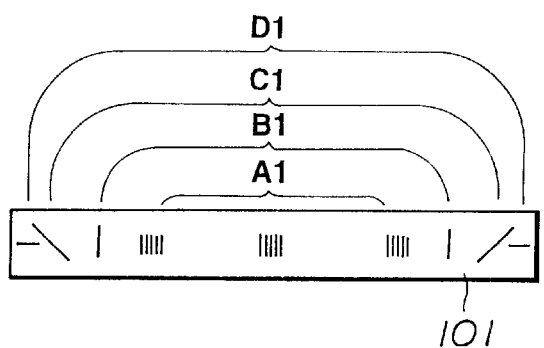
FIG. 7 illustrates a conventional chart for adjustment in the production line.
Figure 6:
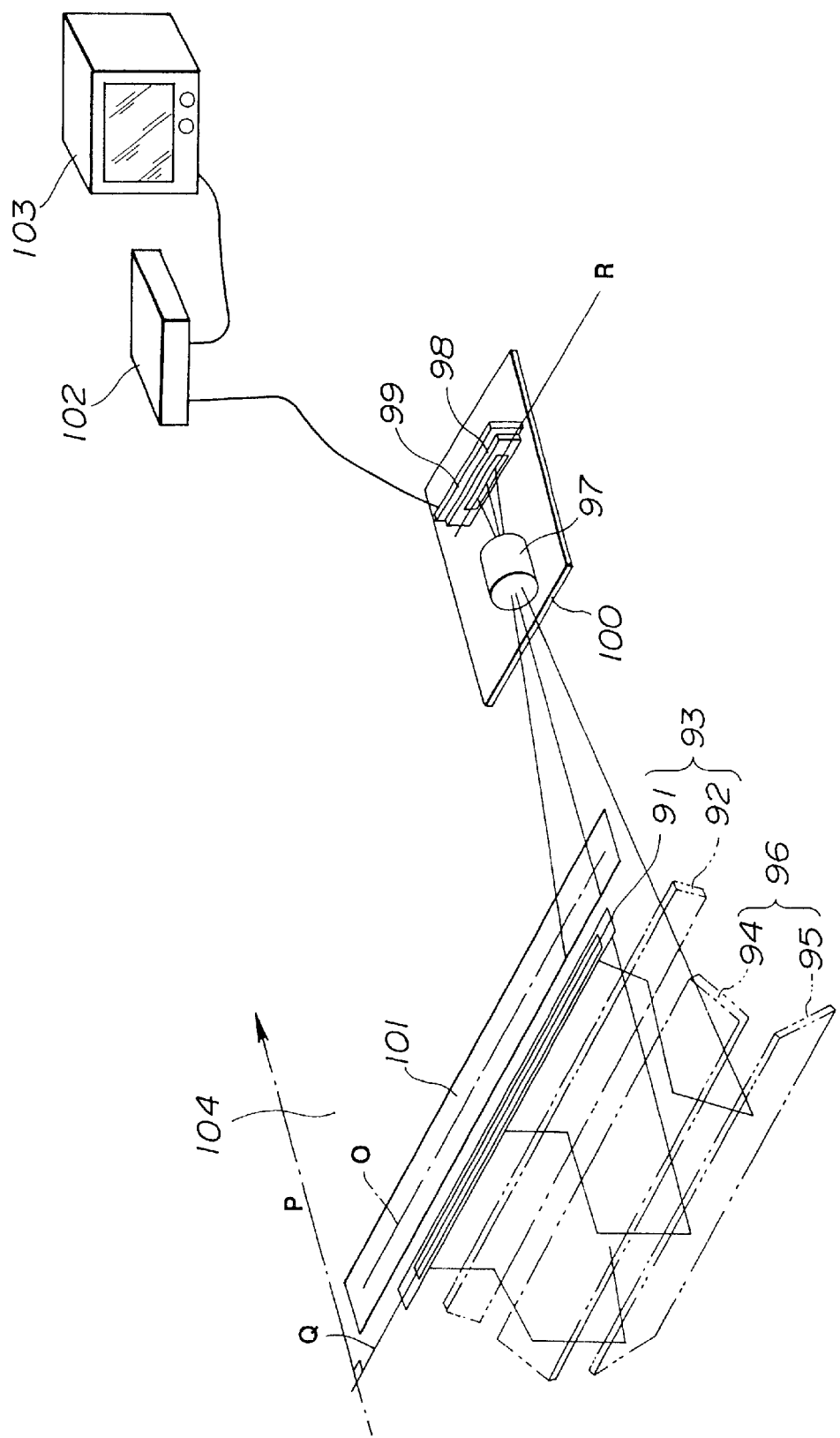
FIG. 6 is a diagram illustrating a conventional method of adjustment in a production line.

Accordingly, optical distortion can be corrected by calculating the difference between the amount of inclination $\Delta 1$ of the image reading position which has been experimentally calculated by a CPU (not shown) incorporated in the main body of the apparatus, and the amount of inclination $\Delta 2$ when installing the apparatus, and adjusting the heights of legs of the main body of an apparatus incorporating the apparatus when installing the apparatus. More specifically, the height of the main body of the apparatus is adjusted by adjusting the heights of adjustors 42-$a$ and 42-$b$ shown in FIGS. 5($a$) and 5($b$). The adjustment is performed in the following manner. Reference numeral 41 identifies casters for carrying the apparatus.

The CPU calculates the amount of adjustment $\Delta A$ for the adjustor using the following expression:

$$|\Delta A| = \Delta H \times \omega.$$

The serviceman determines the sign of $\Delta A$, and determines which of the adjustors 42-$a$ and 42-$b$ must be adjusted. The constant $\omega$ is a coefficient peculiar to the configuration of the image reading apparatus, or the main body of an image forming apparatus, such as an electrophotographic copier or the like, incorporating the image reading apparatus.

As described above, in the present embodiment, it is always possible to adjust distortion in the main body of the apparatus after installing the apparatus. In addition, since the chart is disposed at a position equivalent to the upper surface of the original-mount glass, the chart can be precisely read, and therefore distortion can be precisely adjusted.

In FIG. 1, the white plate 6 disposed on the upper surface of the dummy glass 5 via the chart 7 usually comprises a standard white plate for correcting the sensitivity of the CCD and unevenness in the amount of illuminating light in the longitudinal direction. The effects of the present embodiment may also be obtained by providing the charts on the white plate 6.

In FIG. 1, the member covering the dummy glass 5 is not necessarily a white plate, but may be a member which is sufficiently glossy, such as an almuninum plate or the like. In this case, the effects of the present embodiment may be obtained by sufficiently securing a regular-reflectance component and coating the chart portion in white.

In FIGS. 4$a$ and 4$b$, by providing a linear chart, which is long in the sub-scanning direction, at the center of the charts comprising the two rectangular equilateral triangles, it is possible to detect the amount of deviation both in the synchronous direction and asynchronous direction as well as the amount of inclination.

Although in the above-described embodiment, the adjustor is manually moved, the adjustor may be automatically moved using a motor or the like according to a reading result.

Although in the above-described embodiment shown in FIG. 1, the original-mount glass 4 and the dummy glass 5 are separated from each other, and the charts are provided on the upper surface of the dummy glass 5, the effects of the embodiment may be obtained by configuring the original-mount glass 4 and the dummy glass 5 as one body by extending the original-mount glass 4 outside the effective region (original-mounting region) L of the full-speed mirror unit 1 in the scanning direction.

As described above, according to the present invention, a reference image is provided on substantially the same plane as an original-mounting surface of an original mount, and the reference image is read by an image-reading sensor. Hence, the amount of distortion in the main body of the apparatus can be precisely measured even if the reference image is roughly mounted.

The present invention may also be applied to an image reading unit of an image forming apparatus, such as a well-known copier using an electrophotographic technology, a facsimile apparatus or the like.

The individual components shown in outline in the drawings are all well known in the image reading device arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus, comprising:
   an original mounting plate having an original-mounting surface;
   scanning means for scanning an original mounted on said plate by a light;
   a sensor for sensing the light from the original scanned by said scanning means;
   a reference image provided in the plane including said original-mounting surface;
   adjusting means for adjusting the arrangement between said original-mounting surface and said sensor; and
   determining means for determining the adjustment value by said adjusting means based on a detected distortion obtained from scanning said reference image.

2. An apparatus according to claim 1, wherein said mounting plate comprises an original-mounting region made of glass, and wherein the original-mounting surface comprises an upper surface of the glass.

3. An apparatus according to claim 2, wherein said reference image is provided at a position different from an upper surface of the glass of the original-mounting surface.

4. An apparatus according to claim 2, further comprising glass different from the glass of the original-mounting region in contact with the lower surface of said reference image.

5. An apparatus according to claim 4, further comprising a white plate contacting an upper surface of said reference image.

6. An apparatus according to claim 3, further comprising a switch for moving said scanning means outside a moving region when reading the original.

7. An apparatus according to claim 1, wherein said adjusting means comprises a plurality of adjusting members for adjusting a height of a main body of said apparatus provided at a base portion of a main body of said apparatus.

8. An apparatus according to claim 1, wherein said adjusting means automatically operates in according with the adjustment value.

9. An apparatus according to claim 1, wherein said scanning means comprises a light source for illuminating the original, and a plurality of mirrors for guiding image light obtained from the original to said sensor.

10. An apparatus according to claim 9, further comprising a lens for imaging the image light reflected by said plurality of mirrors onto said sensor, wherein said lens and said sensor are combined in a single unit and are disposed within a main body of said apparatus.

11. An apparatus according to claim 9, further comprising guide rails for guiding said plurality of mirrors in a direction parallel to said original mount, said guide rails being held on side walls of a main body of said apparatus.

12. An apparatus according to claim 1, wherein said sensor comprises a line sensor in which a plurality of photosensors are arranged.

13. An apparatus according to claim 1, wherein said reference image comprises at least two triangles.

14. An apparatus according to claim 13, said reference image is provided near both ends of the maximum original reading width.

15. An image forming apparatus for forming an image on a recording material in accordance with an image signal obtained by reading an original, said image forming apparatus comprising:

an original mounting plate having an original-mounting surface;

scanning means for scanning an original mounted on said plate by a light;

a sensor for sensing the light from the original scanned by said scanning means;

a reference image provided in the plane including said original-mounting surface;

adjusting means for adjusting the arrangement between said original-mounting surface and said sensor; and determining means for determining the adjustment value by said adjusting means based on a detected distortion obtained from scanning said reference image; and image recording means for recording the image scanned by said scanning means on a recording medium using the signal output by said sensor.

16. A method of measuring distortion in a main body of an image reading apparatus comprising the steps of:

scanning a reference image positioned so that an optical distance from the reference image to said sensor is substantially the same as a distance between said sensor and the original-mounting surface in the image reading apparatus;

reading the reference image scanned;

outputting a signal in accordance with the reference image read; and measuring distortion in the main body of the image reading apparatus attributable to a location of use of said apparatus based on the signal output.

17. A method according to claim 16, further comprising the step of:

adjusting the main body of the image reading apparatus to correct the distortion measured.

* * * * *

UNITED STATES PATENT AND TRADEMARK OFFICE
CERTIFICATE OF CORRECTION

PATENT NO. : 6,515,771 B1
DATED : February 4, 2003
INVENTOR(S) : Hiroshi Sato

It is certified that error appears in the above-identified patent and that said Letters Patent is hereby corrected as shown below:

<u>Drawings</u>,
Sheet 3 of 6, please replace sheet 3 of 6 with attached sheet 3 of 6

Signed and Sealed this

Thirtieth Day of March, 2004

JON W. DUDAS
*Acting Director of the United States Patent and Trademark Office*